J. H. HIMES.
STEAM TRAP.
APPLICATION FILED OCT. 14, 1911.

1,032,005.

Patented July 9, 1912.

WITNESSES.
L. E. Thurer
Katherine Holt

INVENTOR.
John H. Himes,
By Morsell & Caldwell
ATTORNEYS.

UNITED STATES PATENT OFFICE.

JOHN H. HIMES, OF MILWAUKEE, WISCONSIN, ASSIGNOR OF ONE-FOURTH TO CHARLES BINDRICH, OF MILWAUKEE, WISCONSIN.

STEAM-TRAP.

1,032,005.

Specification of Letters Patent.

Patented July 9, 1912.

Application filed October 14, 1911. Serial No. 654,599.

*To all whom it may concern:*

Be it known that I, JOHN H. HIMES, a citizen of the United States, and resident of Milwaukee, in the county of Milwaukee and State of Wisconsin, have invented new and useful Improvements in Steam-Traps, of which the following is a description, reference being had to the accompanying drawings, which are a part of this specification.
This invention relates to improvements in steam traps for relieving pipes of the water of condensation.

It is one of the objects of this invention to provide a steam trap which is adapted to automatically empty the pipes of a steam heating or other system of the water of condensation without permitting the escape of any of the live steam.

A further object of the invention is to provide a steam trap which is simple in construction, strong and durable, inexpensive to manufacture and entirely automatic in its operations.

With the above and other objects in view, the invention consists of the improved steam trap and its parts and combinations, as set forth in the claim, and all equivalents thereof.

Figure 1:
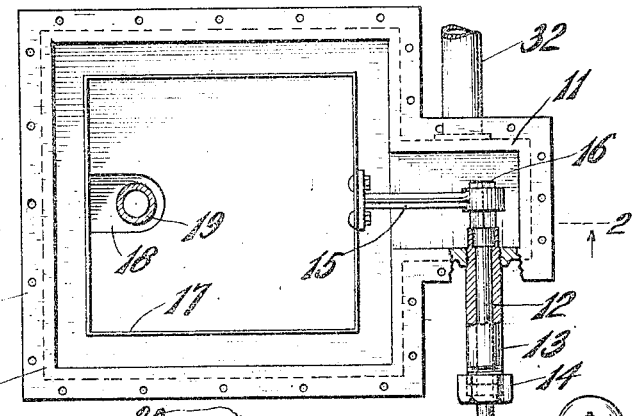
Figure 2:
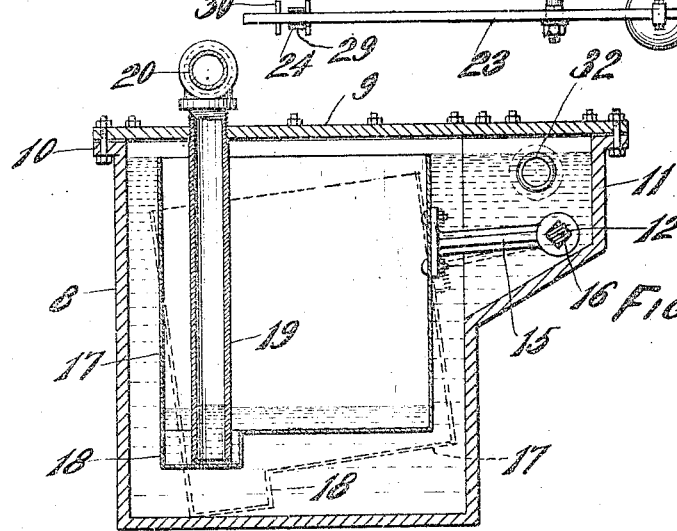
Figure 3:
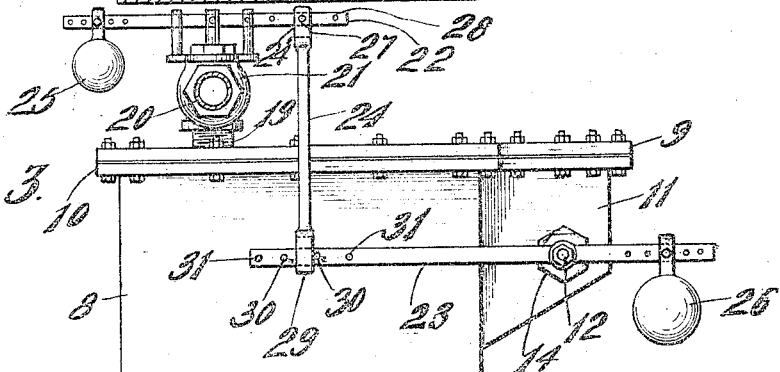

In the accompanying drawing in which the same reference characters indicate similar parts in all of the views: Figure 1 is a top view of the improved steam trap with the cover removed and parts broken away to show interior construction; Fig. 2 is a transverse sectional view thereof taken on line 2—2 of Fig. 1; and Fig. 3 is an outside view of the complete steam trap.

Referring to the drawing the numeral 8 indicates the casing and 9 the cover thereof which is bolted to the flange 10 forming the upper edge of the casing. The casing is of rectangular shape and is provided with an extension portion 11 on one side and through one wall of which a rock shaft 12 extends.
The rock shaft is journaled in a tubular bearing 13 which is threaded into the side of the casing extension and is provided with a stuffing nut 14 on its outer end. A float arm 15, mounted on the inner squared end 16 of the rock shaft and extending into the casing proper, carries a rectangular open top float 17 on its free end which is adapted to swing vertically in the chamber formed by said casing. The float is provided with a depression or pocket 18 in its bottom portion into which extends the lower end of a discharge pipe 19 when the said float is in its uppermost position. The upper end of the discharge pipe is threaded through the casing cover and is connected to a horizontal line of piping 20 which is adapted to carry off the water discharged from the trap. This horizontal line of piping is provided with a valve 21 to control the flow of the water therethrough from the float.

The valve is opened and closed by means of a lever arm 22 which is connected to a lever 23 mounted on the end of the rock shaft 16 by a connecting rod 24. Both levers 22 and 23 are provided on their free ends with counterweights 25 and 26 respectively which are adjustably connected to the levers to provide for nicely balancing the parts and cause them to move with a minimum amount of friction. The connecting rod 24 is also adjustably connected to the levers 22 and 23 and at its upper end this adjustment comprises a bifurcated rod end 24' straddling the lever 22 and a pin 27 extending through the rod ends and through one of a plurality of openings 28 of the lever 22. The lower end of the connecting rod is in the form of a loop 29 through which the lever 23 loosely extends, and pins 30, projecting from the side of the lever 23, serve to hold the connecting rod in adjusted position. The lever 23 is provided with a number of pin openings 31 in order to adjust the position of said pins. The water of condensation enters the trap through the inlet pipe 32, which is threaded into the extension of the casing and is connected to the heating or other system.

In operation the casing is presumed to be partly filled with water and the float to be in its uppermost position and the valve closed. The water of condensation under pressure will flow into the trap and gradually rise to a point where it will overflow the upper edge of the float and fill said float and when filled it will lose its buoyancy and swing downwardly to the bottom of the casing with a quick positive motion. This movement will cause the connected levers to open the valve and the pressure within the casing will force the water in the float out through the discharge pipe. The water within the float will continue to flow through the discharge pipe until the said float is emptied to such an extent that its buoyancy will cause it to rise and in rising to close the valve. The parts will remain in this position until the water again rises and overflows the float, when the same operation will be repeated.

From the foregoing description it will be seen that the steam trap is simple in construction and automatic in its operation, and is well adapted for the purpose described.

What I claim as my invention is:

A steam trap, comprising a casing having an extension projecting from one side thereof and said extension provided with an inlet opening, a tubular bearing connected to the extension and having a stuffing nut on one end, a rock shaft extending through the bearing, an arm mounted on the inner end of the rock shaft, a float carried by the inner end of said arm, said float having an open upper portion and a lower depressed portion, a discharge pipe extending through the casing and into the depressed portion of the float, a valve controlling the flow through said pipe and positioned outside of the casing, a lever for opening and closing said valve, a lever mounted on the outer end of the rock shaft, counterweights carried by said levers, and a link connecting the levers together.

In testimony whereof, I affix my signature, in presence of two witnesses.

JOHN H. HIMES.

Witnesses:
C. H. KEENEY,
CLARA V. MUEHLBACH.